United States Patent
Unnikrishnan et al.

(10) Patent No.: US 8,296,774 B2
(45) Date of Patent: Oct. 23, 2012

(54) SERVICE-BASED ENDPOINT DISCOVERY FOR CLIENT-SIDE LOAD BALANCING

(75) Inventors: Umesh Unnikrishnan, Sammamish, WA (US); Kshamta Jerath, Bothell, WA (US); William D. Taylor, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 789 days.

(21) Appl. No.: 12/492,221

(22) Filed: Jun. 26, 2009

(65) Prior Publication Data

US 2010/0333104 A1    Dec. 30, 2010

(51) Int. Cl.
*G06F 9/46* (2006.01)
(52) U.S. Cl. ............................................. 718/105
(58) Field of Classification Search .................. 718/105
See application file for complete search history.

(56) References Cited

U.S. PATENT DOCUMENTS

| | | | |
|---|---|---|---|
| 5,884,035 A | 3/1999 | Butman | |
| 6,078,960 A * | 6/2000 | Ballard | 709/229 |
| 7,404,189 B2 | 7/2008 | Benedetti | |
| 2004/0186897 A1 | 9/2004 | Knauerhase | |
| 2009/0043809 A1 | 2/2009 | Fakhouri | |

OTHER PUBLICATIONS

"Administration and Configuration Guide," JBoss Community, Nov. 2008, 225 pages.
"CMI (Clustered Method Invocation)" accessed on Apr. 14, 2009.
Calloway, Robert David, "An Autonomic Service Delivery Platform for Service Oriented Network Environments," 2008, 161 pages.
Sacha et al., "A Service Oriented Peer-to-Peer Architecture for a Digital Ecosystem," Copyright © 2007 IEEE, 7 pages.

* cited by examiner

*Primary Examiner* — Meng An
*Assistant Examiner* — Blake Kumabe
(74) *Attorney, Agent, or Firm* — Merchant & Gould

(57) ABSTRACT

A server farm includes a plurality of server devices. The plurality of server devices includes a plurality of topology service endpoints and a plurality of target service endpoints. A client computing system sends a topology service request to one of the topology service endpoints. In response, the topology service endpoint sends target service endpoint Uniform Resource Identifiers (URIs) to the client computing system. When a client application at the client computing system needs to send a target service request to one of the target service endpoints, the client computing system applies a load balancing algorithm to select one of the target service endpoint URIs. The client computing system then sends a target service request to the target service endpoint identified by the selected one of the target service endpoint URIs. In this way, the client computing system may use a load balancing algorithm appropriate for the client application.

20 Claims, 5 Drawing Sheets

SERVICE-BASED ENDPOINT DISCOVERY FOR CLIENT-SIDE LOAD BALANCING

BACKGROUND

The performance of a server device can degrade when the server device receives too many service requests in a given period of time. Accordingly, a server farm may include a plurality of server devices that provide the same service. The server farm may also include a load balancing device. When a client device sends a service request to a server farm, the load balancing device forwards the request to one of the server devices. In this way, no single one of the server devices in the server farm receives so many requests that the performance of the server farm is degraded.

SUMMARY

A server farm includes a plurality of server devices. The plurality of server devices includes a plurality of topology service endpoints and a plurality of target service endpoints. A client computing system sends a topology service request to one of the topology service endpoints. In response, the topology service endpoint sends target service endpoint resource identifiers to the client computing system. The target service endpoint resource identifiers identify the target service endpoints. When a client application at the client computing system needs to send a target service request to one of the target service endpoints, the client computing system applies a load balancing algorithm to select one of the target service endpoint resource identifiers. The client computing system then sends a target service request to the target service endpoint identified by the selected one of the target service endpoint resource identifiers. In this way, the client computing system may use a load balancing algorithm appropriate for the client application.

This summary is provided to introduce a selection of concepts in a simplified form. These concepts are further described below in the Detailed Description. This summary is not intended to identify key features or essential features of the claimed subject matter, nor is this summary intended as an aid in determining the scope of the claimed subject matter.

DETAILED DESCRIPTION

As briefly described above, a server farm includes a plurality of topology service endpoints and a plurality of target service endpoints. A client computing system receives a plurality of target service endpoint URIs from one of the topology service endpoints, uses a load balancing algorithm to select one of the target service endpoint URIs, and sends a target service request to the target service endpoint identified by the selected target service endpoint URI. The techniques of this disclosure are described with reference to the attached figures. It should be appreciated that the attached figures are provided for purposes of explanation only and should not be understood as representing a sole way of implementing the techniques of this disclosure.

Figure 1:
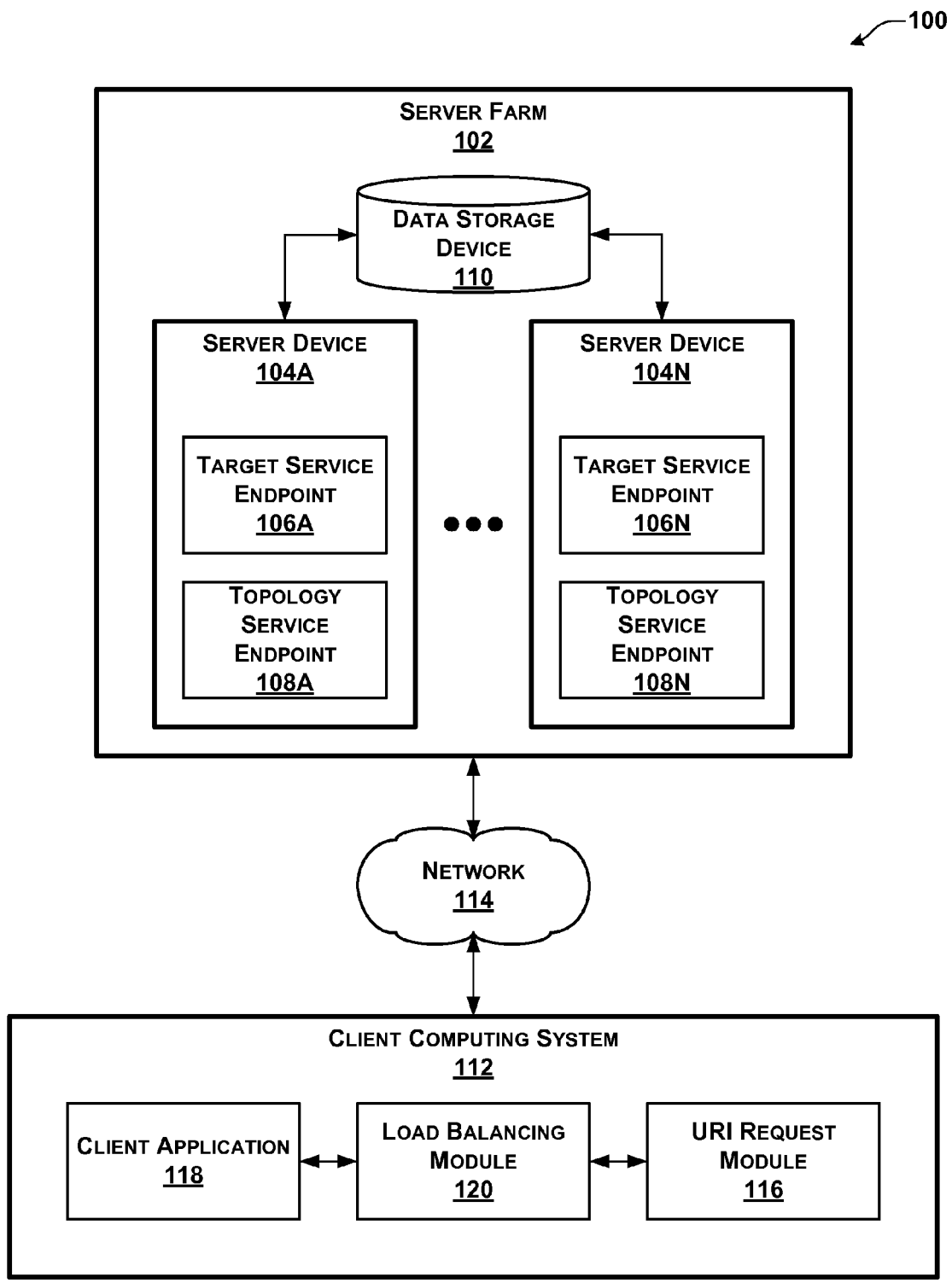
FIG. 1 is a block diagram illustrating an example load balancing system.

FIG. 1 is a block diagram illustrating an example load balancing system 100. It should be appreciated that the load balancing system 100 is merely an example. Other load balancing systems that implement the techniques of the disclosure may include more or fewer computing systems or components.

As illustrated in the example of FIG. 1, the load balancing system 100 comprises a server farm 102. As used in this disclosure, a server farm is a plurality of physical computing devices that provides one or more services to client computing systems. A physical computing device is a physical machine that comprises physical electronic components. Electronic components are physical entities that affect electrons or fields of electrons in a desired manner consistent with the intended function of a physical computing device. Example types of electronic components include capacitors, resistors, diodes, transistors, and other types of physical entities that affect electrons or fields of electrons in a manner consistent with the intended function of a physical computing device. An example physical computing device is described below with reference to FIG. 5.

In some implementations, one or more of the physical computing devices in the server farm 102 host one or more virtual machines. As used in this disclosure, a virtual machine is a software application that emulates a physical computing device. Consequently, a single one of the physical computing devices in the server farm 102 may behave like two or more separate physical computing devices. As used in this disclosure, the term "computing device" encompasses physical computing devices and virtual machines.

Furthermore, as used in this disclosure, a computing device provides a service when the computing device performs an action specified by the service definition of the service for each allowable input to the service. Furthermore, as used in this disclosure, a service definition is a set of allowable inputs and a set of mappings from each of the allowable inputs to an action.

The server farm 102 includes server devices 104A-104N (collectively, "server devices 104"). Each of the server devices 104 is a computing device. The server devices 104 include target service endpoints 106A-106N (collectively, "target service endpoints 106"). Although not illustrated in the example of FIG. 1 for the sake of simplicity, the server farm 102 may include server devices that do not include the target service endpoints. As used in this disclosure, a computing device includes an endpoint of a service when the computing device provides the service. For instance, a target service endpoint is a computing device that provides the target service.

In different instances, the target service is a variety of different types of services. In a first example, the target service receives search queries, identifies web pages in a website that satisfy the search query, and returns lists of the web pages in the website that satisfy the search query. In a second example, the target service receives requests for video streams and responds to the requests by sending the video streams. In a third example, the target service validates digital certificates provided by client computing systems.

Furthermore, the server devices 104 include topology service endpoints 108A-108N (collectively, "topology service endpoints 108"). Although not illustrated in the example of FIG. 1 for the sake of simplicity, the server farm 102 may include server devices that do not include the topology service endpoints. Furthermore, although not illustrated in the example of FIG. 1 for the sake of simplicity, the server farm 102 may include server devices that include target service endpoints, but not the topology service endpoint. The server farm 102 may also include server devices that include topology service endpoints, but not target service endpoints.

The server farm 102 also includes a data storage device 110. The data storage device 110 is a computing device. The data storage device 110 stores a plurality of target service endpoint resource identifiers. A target service endpoint resource identifier is a resource identifier that identifies a target service endpoint (i.e., a server device that provides the target service). For instance, a first target service endpoint resource identifier identifies the target service endpoint 106A and a second target service endpoint resource identifier identifies the target service endpoint 106N. In some implementations, the data storage device 110 is one of the server devices 104. In different implementations, the target service endpoint resource identifiers conform to different addressing schemes. For instance, in a first example implementation, the target service endpoint resource identifiers conform to the Uniform Resource Identifier (URI) addressing scheme. In other words, the target service endpoint resource identifiers are URIs. In a second example implementation, the target service endpoint resource identifiers conform to a file system addressing scheme. However, for ease of explanation, this disclosure assumes that the target service endpoint resource identifiers are URIs.

In addition, the data storage device 110 stores a plurality of topology service endpoint resource identifiers. A topology service endpoint resource identifier is a resource identifier that identifies a topology service endpoint (i.e., a server device that provides the topology service). In different implementations, the topology service endpoint resource identifiers conform to different addressing schemes. For instance, in a first example implementation, the topology service endpoint resource identifiers are URIs. In a second example implementation, the topology service endpoint resource identifiers conform to a file system addressing scheme. However, for ease of explanation, this disclosure assumes that the topology service endpoint resource identifiers are URIs.

In one example implementation, a target service endpoint URI comprises a first part that identifies a server device and a second part that identifies the target service. For example, the following may be a target service endpoint URI: "http://device1/targetservice". In this example, "device1" identifies a server device and "targetservice" identifies the target service. It should be appreciated that in other instances, the target service URIs may be differently formatted and may not specify Hypertext Transfer Protocol (HTTP) as a URI scheme.

The target service endpoint URIs and the topology service endpoint URIs in the data storage device 110 may be updated in response to a variety of events. For instance, the target service endpoints URIs in the data storage device 110 may be automatically updated when a target service endpoint stops working or when a new target service endpoint comes online. In different implementations, the target service endpoint URIs and the topology service endpoint URIs in the data storage device 110 may be updated automatically and/or manually by an administrator.

The load balancing system 100 also comprises a client computing system 112. The client computing system 112 is a set of one or more physical computing devices. As used in this disclosure, a computing system is a set of one or more physical computing devices. Furthermore, in some instances, the client computing system 112 hosts one or more virtual machines. Although not illustrated in the example of FIG. 1 for the sake of simplicity, the load balancing system 100 may include many other client computing systems.

The load balancing system 100 also comprises a network 114. The network 114 facilitates communication between the server farm 102 and the client computing system 112. The network 114 may be a wide variety of different types of electronic communication networks. For example, the network 114 may be a wide-area network, such as the Internet, a local-area network, a metropolitan-area network, or another type of electronic communication network. The network 114 may include wired and/or wireless data links. A variety of communications protocols may be used in the network 114 including, but not limited to, Ethernet, Transport Control Protocol (TCP), Internet Protocol (IP), Hypertext Transfer Protocol (HTTP), SOAP, remote procedure call protocols, and/or other types of communications protocols. In instances where the load balancing system 100 comprises a plurality of other client computing systems, the network 114 facilitates communication between the server farm 102 and the other client computing systems.

As illustrated in the example of FIG. 1, the client computing system 112 comprises a URI request module 116. The URI request module 116 is a functional component of the client computing system 112. As used in this disclosure, a functional component is a sub-part of a system, the sub-part having a well-defined purpose and functionality. The URI request module 116 may be implemented in a variety of ways. For instance, in some example implementations, the URI request module 116 comprises a set of software instructions that, when executed by a processing unit of the client computing system 112, causes the client computing system 112 to perform specific actions. As used in this disclosure, a processing unit is a set of one or more physical integrated circuits capable of executing software instructions. In some implementations, the set of integrated circuits is a set of microprocessors. As used in this disclosure, a software instruction is a data structure that represents an operation of a processing unit. For example, a software instruction may be a data structure comprising an operation code and zero or more operand specifiers. In this example, the operand specifiers may specify registers, memory addresses, or literal data.

The URI request module 116 sends a topology service request to a given one of the topology service endpoints 108 in the server farm 102 via the network 114. For instance, the URI request module 116 may send the topology service request to one of the server devices 104. The topology service request specifies a topology service endpoint URI that identifies the given topology service endpoint.

In response to the topology service request, the given topology service endpoint sends a topology service response to the client computing system 112 via the network 114. The topology service response conforms to the service definition of the topology service. In other words, the topology service definition maps the topology service request to the topology service response. The topology service response comprises the plurality of target service endpoint URIs. When the client computing system 112 receives the topology service response, the URI request module 116 stores the plurality of target service endpoint URIs at the client computing system 112.

As illustrated in the example of FIG. 1, the client computing system 112 also comprises a client application 118. The client application 118 is another functional component of the client computing system 112. The client application 118 may be implemented in a variety of ways. For instance, in some example implementations, the client application 118 comprises a set of software instructions that, when executed by the processing unit of the client computing system 112, causes the client computing system 112 to perform specific actions. In different instances, the client application 118 may or may not be a software application that provides a tool directly to a human user.

As illustrated in the example of FIG. 1, the client computing system 112 comprises a load balancing module 120. The load balancing module 120 is a functional component of the client computing system 112. The load balancing module 120 may be implemented in a variety of ways. For instance, in some example implementations, the load balancing module 120 comprises a set of software instructions that, when executed by a processing unit of the client computing system 112, causes the client computing system 112 to perform specific actions.

The client application 118 is a client of the target service. In other words, the client application 118 uses the target service to perform some functionality. To use the target service 106, the client application 118 sends target service requests to individual ones of the target service endpoints 106 in the server farm 102 and receives target service responses from individual ones of the target service endpoints 106 in the server farm 102. It should be appreciated that, in some instances, the client computing system 112 comprises a plurality of client applications that are clients of the target service.

To send a target service request to one of target service endpoints 106, the client application 118 sends a request for a target service endpoint URI to the load balancing module 120. In response to the request for a target service endpoint URI, the load balancing module 120 uses a load balancing algorithm to select a given target service endpoint URI from among the plurality of target service endpoint URIs received from one of topology service endpoints 108. After selecting the given target service endpoint URI, the load balancing module 120 passes the given target service endpoint URI back to the client application 118 as a response to the request for a target service endpoint URI. Upon receiving the given target service endpoint URI from the load balancing module 120, the client application 118 sends a target service request to the one of the target service endpoints 106 identified by the given target service endpoint URI. In some implementations, the target service request specifies the given target service endpoint URI.

In some implementations, the target service request specifies information in addition to the target service endpoint URI. For example, the target service request may specify a method of an application programming interface (API) implemented by the target service and parameters of the method. In another example, the target service request specifies data defining a word processor document.

In different implementations, the target service request is formatted in different ways. For instance, in a first example implementation, the target service request conforms to the SOAP protocol. In a second example implementation, the target service request conforms to the HTTP protocol.

Furthermore, in some implementations, the client application 118 receives a target service response in response to the target service request. In different instances, the target service response may contain a wide variety of different types of data.

Figure 2:
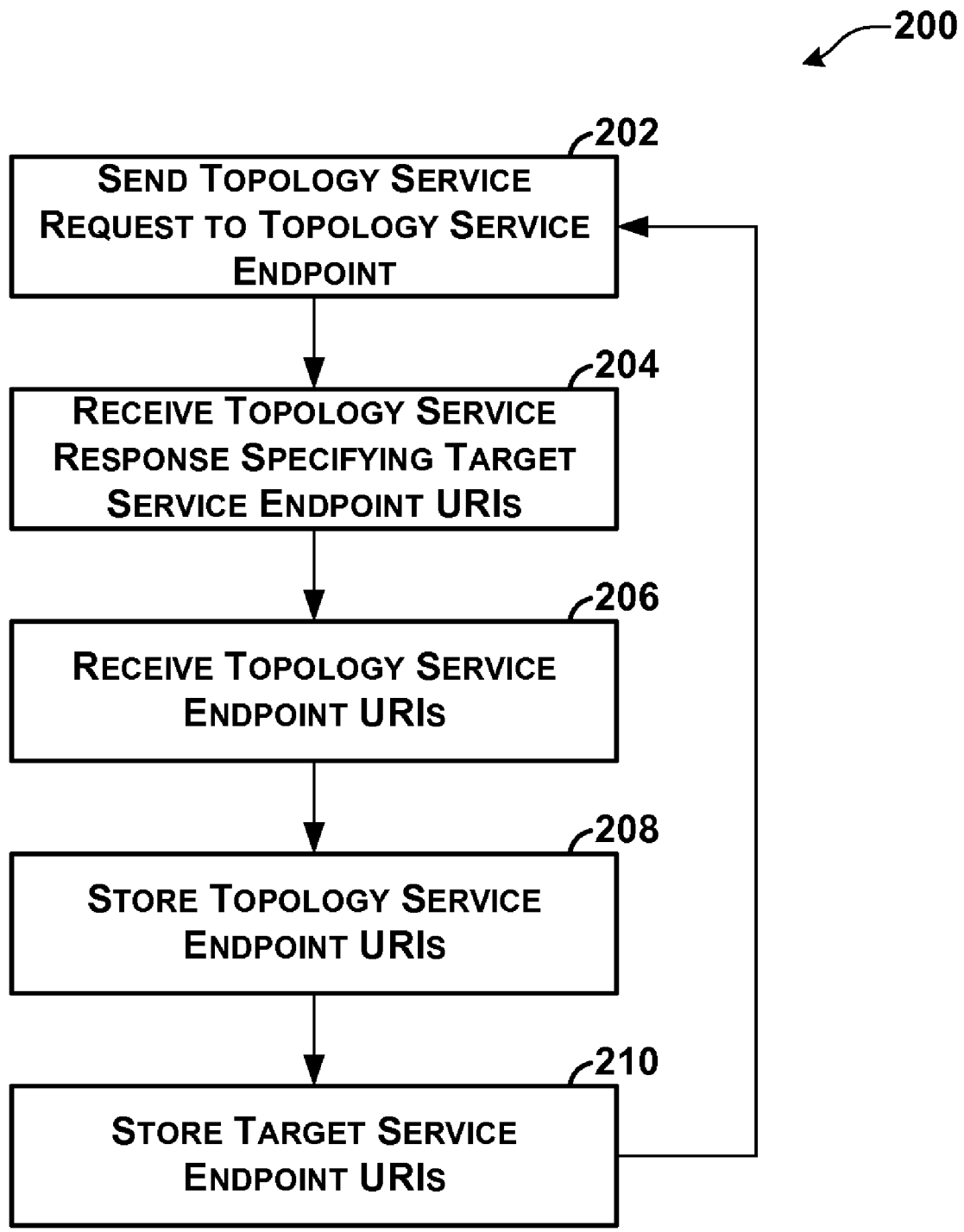
FIG. 2 is a flowchart illustrating an example operation of a Uniform Resource Identifier (URI) request module to obtain target service endpoint URIs.

FIG. 2 is a flowchart illustrating an example operation 200 of the URI request module 116 to obtain target service endpoint URIs. It should be appreciated that the operation 200 is an example provided for purposes of explanation only. In other implementations, operations to obtain target service endpoint URIs may involve more or fewer steps, or may involve the steps of the operation 200 in a different order. Furthermore, the operation 200 is explained with reference to FIG. 1. It should be appreciated that other operations to obtain target service endpoint URIs may be used in different systems and in computing systems having components other than those illustrated in the example of FIG. 1.

As illustrated in the example of FIG. 2, the operation 200 starts when the URI request module 116 sends a topology service request to a given one of the topology service endpoints 108 in the server farm 102 via the network 114 (202). In some implementations, the topology service request specifies a topology service endpoint URI that identifies the given topology service endpoint. Furthermore, in various implementations, the topology service request specifies other data. For instance, in one example implementation, the topology service request specifies a maximum number of target service endpoint URIs to return. In another instance, the topology service request specifies a method of an API implemented by the topology service.

In different implementations, the topology service request is implemented in various ways. For example, in a first implementation, the topology service request conforms to the SOAP protocol. In another implementation, the topology service request conforms to the HTTP protocol. Furthermore, in another implementation, the URI request module 116 is able to send topology service requests that conform to different protocols. For instance, the URI request module 116 may be able to send topology service requests that conform to the SOAP protocol and topology service requests that conform to the binary TCP protocol.

After the URI request module 116 sends the topology service request to the given topology endpoint, the URI request module 116 receives a topology service response from the given topology endpoint via the network 114 (204). The topology service response is in response to the topology service request. The topology service response specifies a plurality of target service endpoint URIs. The topology service response conforms to the service definition of the topology service. The topology service response may be formatted in a variety of ways. For example, the topology service response may conform to the SOAP protocol.

In addition to the plurality of target service endpoint URIs, the URI request module 116 receives a plurality of topology service endpoint URIs (206). The topology service endpoint URIs identify topology service endpoints in the server farm 102. In response to receiving the topology service endpoint URIs, the URI request module 116 stores the topology service endpoint URIs (208). In some implementations, prior to receiving the topology service endpoint URIs in the topology service response, the client computing system 112 only stores the topology service endpoint URI of the given topology service endpoint.

In some implementations, the URI request module 116 receives the topology service endpoint URIs in the topology service response. In a first example, the topology service response may comprise an Extensible Markup Language (XML) document containing XML elements that specify the target service endpoint URIs and XML elements that specify the topology service endpoint URIs. In a second example, the URI request module 116 receives the topology service endpoint URIs separately from the topology service response. For instance, the URI request module 116 may send a second topology service request to one of the topology service endpoints 108. In this second example, the second topology service request specifies a topology service endpoint URI that identifies the given topology service endpoint. The topology service endpoint URI also includes a parameter that generically identifies the topology service. In other words, the parameter indicates the topology service without indicating one of topology service endpoints 108. In various implementations, the parameter may generically identify the topology service in different ways. For instance, the parameter may specify a URI that generically identifies the topology service. In another instance, the parameter specifies a globally unique identifier (GUID) that generically identifies the topology service. In this second example, the URI request module 116 receives the topology service endpoint URIs in response to the second topology service request.

Furthermore, in some example implementations, the URI request module 116 does not receive or store topology service endpoint URIs. In such implementations, the topology service may be externally load balanced. In other words, a load balancer device automatically distributes topology service requests among the topology service endpoints 108.

After the URI request module 116 receives the target service endpoint URIs in the topology service response, the URI request module 116 stores the target service endpoint URIs (210). In different implementations, the URI request module 116 stores the target service endpoint URIs in different ways. For instance, the URI request module 116 may store all or some of the target service endpoint URIs as one or more variables in random access memory. In another instance, the URI request module 116 stores all or some of the target service endpoint URIs to a hard disk drive.

At some time after the URI request module 116 stores the target service endpoint URIs, the URI request module 116 loops back and again sends a new topology service request to the given topology service endpoint, thereby repeating the operation 200 (202). Thus, the URI request module 116 automatically receives new topology service responses containing updated target service endpoint URIs that identify target service endpoints currently in the server farm 102. Consequently, the load balancing module 120 knows not to select target service endpoint URIs identifying target service endpoints that have stopped working. Similarly, the load balancing module 120 is able to select target service endpoint URIs identifying target service endpoints that have been added to the server farm 102. In various implementations, the URI request module 116 may send new topology service requests at regular or irregular intervals. For example, in one example implementation, the URI request module 116 sends a new topology service request every fifteen minutes. In another example implementation, the URI request module 116 sends a new topology service request at random intervals. In a third example implementation, the URI request module 116 sends a new topology service request in response to an event directly or indirectly generated by a user of the client computing system 112. In a fourth example implementation, the URI request module 116 sends a new topology service request whenever the load balancing module 120 receives a request for a target service endpoint URI.

In some implementations where the URI request module 116 obtains topology service endpoint URIs, the URI request module 116 sends a request to the load balancing module 120 for a topology service endpoint URI prior to sending the new topology service request. In such implementations, the load balancing module 120 responds to the request by selecting a given topology service endpoint URI from among the topology service endpoint URIs obtained by the URI request module 116. The load balancing module 120 uses a load balancing algorithm to select the given topology service endpoint URI from among the topology service endpoint URIs obtained by the URI request module 116. In different implementations, the load balancing algorithm to select the given topology service endpoint URI may be the same or different form a load balancing algorithm to select a given target service endpoint URI from the plurality of target service endpoint URIs. After selecting the given topology service endpoint URI, the load balancing module 120 returns the given topology service endpoint URI to the URI request module 116. The URI request module 116 the constructs the new topology service request such that the new topology service request specifies the given topology service endpoint URI. In this way, topology service requests are load balanced across topology service endpoints in the server farm 102.

Figure 3:
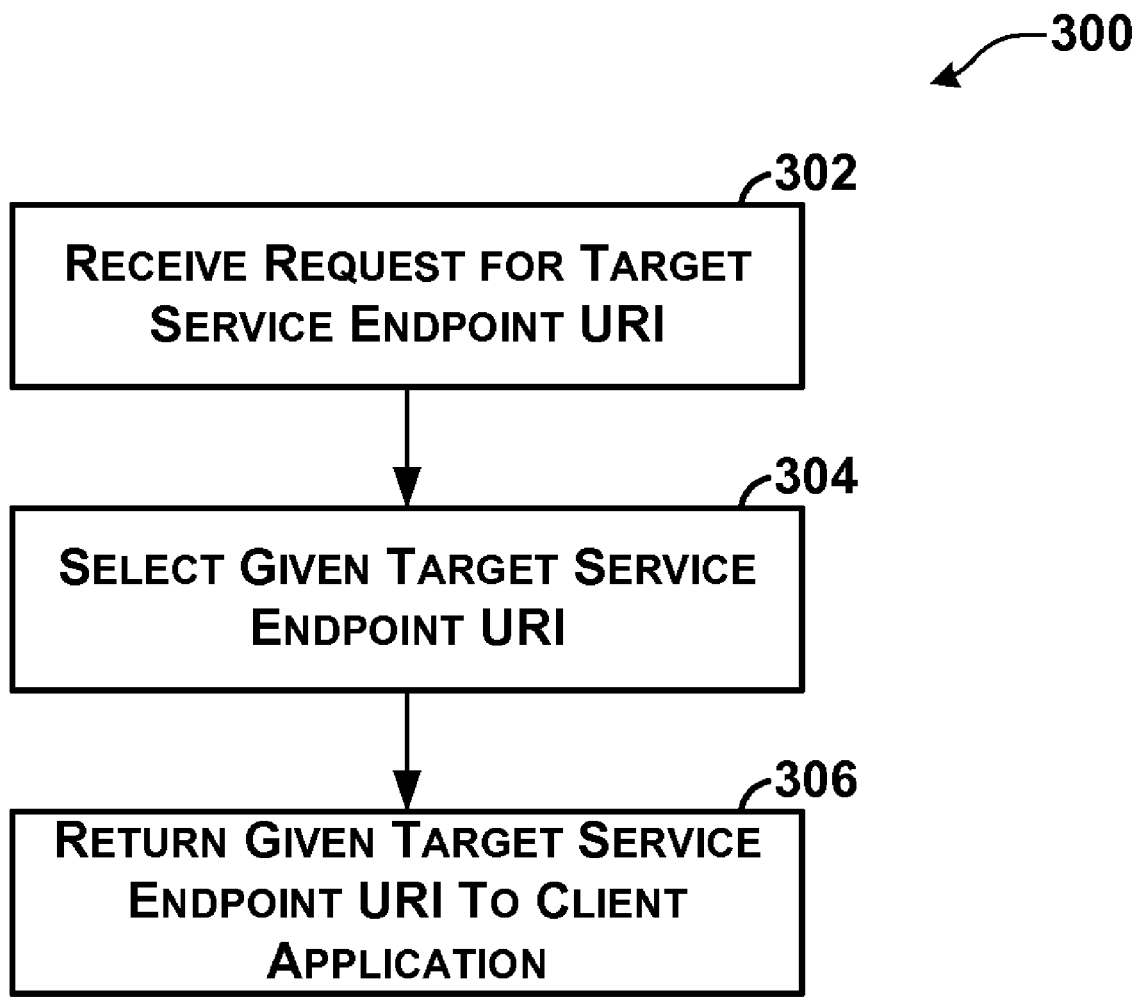
FIG. 3 is a flowchart illustrating an example operation of a load balancing module to provide a target service endpoint URI to a client application.

FIG. 3 is a flowchart illustrating an example operation 300 of the load balancing module 120 to provide a target service endpoint URI to the client application 118. It should be appreciated that the operation 300 is an example provided for purposes of explanation only. In other implementations, operations to provide a target service endpoint URI to the client application 118 may involve more or fewer steps, or may involve the steps of the operation 300 in a different order. Furthermore, the operation 300 is explained with reference to FIG. 1. It should be appreciated that other operations to provide a target service endpoint URI to the client application 118 may be used in different systems and in computing systems having components other than those illustrated in the example of FIG. 1.

As illustrated in the example of FIG. 3, the operation 300 begins when the load balancing module 120 receives a request for a target service endpoint URI from the client application 118 (302). In different implementations, the load balancing module 120 receives the request for a target service endpoint URI from the client application 118 in a variety of ways. For instance, in a first example implementation, the load balancing module 120 implements an API. In this first example implementation, the load balancing module 120 receives the request for a target service endpoint URI from the client application 118 when the client application 118 invokes a method of the API. In a second example implementation, the load balancing module 120 receives the request for a target service endpoint URI from the client application 118 when the load balancing module 120 receives an inter-process communication message from the client application 118.

In response to receiving the request for a target service endpoint URI from the client application 118, the load balancing module 120 selects a given target service endpoint URI from among the target service endpoint URIs obtained by the URI request module 116 (304). The load balancing module 120 applies a load balancing algorithm to select the given target service endpoint URI from among the target service endpoint URIs obtained by the URI request module 116. After the load balancing module 120 selects the given target service endpoint URI, the load balancing module 120 returns the given target service endpoint URI to the client application 118 as a response to the request for a target service endpoint URI (306).

In different instances, the load balancing module 120 applies different load balancing algorithms to select the given target service endpoint URI from among the target service endpoint URIs obtained by the URI request module 116. For instance, in a first example implementation, the load balancing module 120 uses a round-robin load balancing algorithm to select the given target service endpoint URI from among the target service endpoint URIs obtained by the URI request module 116. In a second example implementation, the load balancing module 120 randomly selects the given target service endpoint URI from among the target service endpoint URIs obtained by the URI request module 116. In a third example implementation, the load balancing module 120 uses a load balancing algorithm that tracks the processing loads on each of the target service endpoints 106 and selects a target service endpoint URI of a target service endpoint having a lowest processing load.

In some instances, the load balancing module 120 is a load balancing object that is an instantiation of a load balancing class. As used in this disclosure, a class is an object-oriented programming language construct that is used as blueprint to create objects. Furthermore, as used in this disclosure, an object is a data structure in object-oriented programming languages consisting of data fields and methods that are able manipulate the data fields. In such instances, a default implementation of a method of the load balancing class uses a first load balancing algorithm to select the given target service endpoint URI from among the target service endpoint URIs obtained by the URI request module 116. For example, the default implementation of the method may use a round-robin load balancing algorithm. Furthermore, in such instances, a programmer of the client application 118 is able to create a new load balancing class that extends the load balancing class. In the new load balancing class, a new implementation of the method overrides the default implementation of the method. The new implementation of the method uses a second load balancing algorithm to select the given target service endpoint URI from among the target service endpoint URIs obtained by the URI request module 116. For example, the new implementation of the method may use a load balancing algorithm that tracks load on the target service endpoints 106. In this way, the programmer is able to customize which load balancing algorithm is used to select the given target service endpoint URI from among the target service endpoint URIs obtained by the URI request module 116.

Furthermore, in some instances, a plurality of client applications execute at the client computing system 112. In such instances, the load balancing module 120 may use different load balancing algorithms to provide target service endpoint URIs to different ones of the client applications. Continuing the example of the previous paragraph, a second client application at the client computing system 112 may use a second load balancing object to obtain a target service endpoint URI. The second load balancing object is an instantiation of the un-extended load balancing class. Hence, when the second client application invokes the method of the second load balancing object, the client computing system 112 uses the default version of the method to select a given target service endpoint URI from the plurality of target service endpoint URIs.

The programmer of the client application 118 may choose to override the default load balancing algorithm for a variety of reasons. For example, the client application 118 may use the target service to process data in a spreadsheet stored at the server farm 102. In this example, it may be computationally expensive for an individual one of the target service endpoints 106 to load the spreadsheet, but it may be relatively inexpensive to process the data in the spreadsheet after the spreadsheet is loaded. Furthermore, in this example, the target service endpoints 106 are able to temporarily cache the spreadsheet after loading the spreadsheet. If the load balancing module 120 uses a round-robin load balancing algorithm, the load balancing module 120 would provide a different target service endpoint URI to the client application 118 each time the client application 118 needs to use the target service to process data in the spreadsheet. Consequently, the client application 118 would send target service requests to different ones of the target service endpoints 106 and the target service endpoints 106 would have to load the spreadsheet in response to each of the target service requests. This would be wasteful because the target service endpoints 106 would not take advantage of caching the spreadsheet. However, suppose the programmer of the client application 118 overrides the default load balancing algorithm with a new load balancing algorithm that randomly selects one of the target service endpoint URIs. After initially selecting one of the target service endpoint URIs, the new load balancing algorithm selects the same target service endpoint URI in response to any request from the client application 118 for a target service endpoint URI received during the next fifteen minutes. In this way, the client application 118 would continue to send target service requests to the same one of the target service endpoints 106 and the target service endpoint would be able to use the cached spreadsheet. As a result, performance of the target service endpoint and the client application 118 may be improved. It should be appreciated that for other client applications, other load balancing algorithms may be more advantageous.

Furthermore, in some implementations, the load balancing module 120 only selects the given target service endpoint URI from among those target service endpoint URIs obtained by the URI request module 116 that are not blacklisted. In such implementations, the load balancing module 120 receives a request from the client application 118 to blacklist a particular target service endpoint URI when a target service endpoint identified by the particular target service endpoint URI failed to respond to a target service request sent to the target service endpoint.

In different implementations, the load balancing module 120 receives a request to blacklist a particular target service endpoint URI in different ways. For instance, in the example implementation where the load balancing module 120 is an object that is an instantiation of a class, the load balancing module 120 includes a blacklisting method. In this instance, the load balancing module 120 receives the request to blacklist the particular target service endpoint URI when the client application 118 invokes the blacklisting method.

Figure 4:
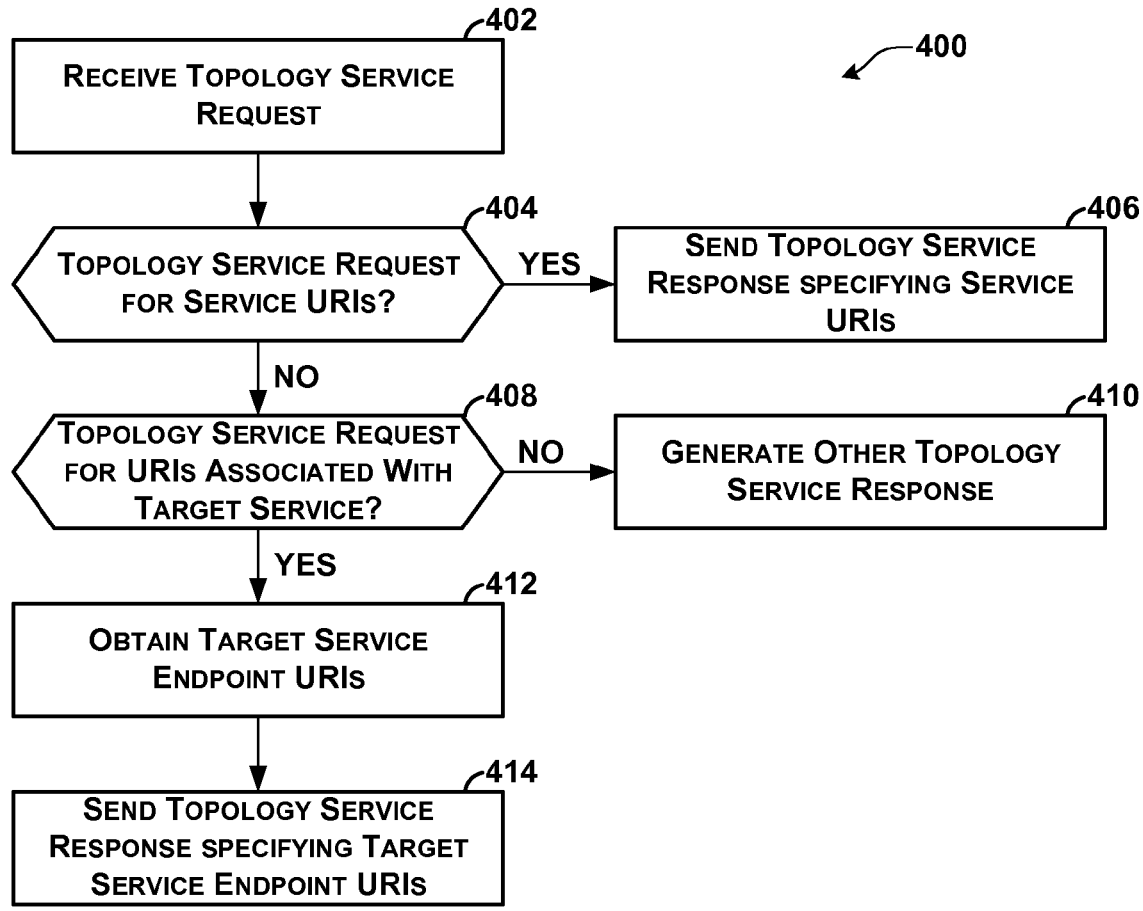
FIG. 4 is a flowchart illustrating an example operation of a topology service endpoint to respond to a topology service request.

FIG. 4 is a flowchart illustrating an example operation 400 of a topology service endpoint to respond to a topology service request. It should be appreciated that the operation 400 is an example provided for purposes of explanation only. In other implementations, operations to respond to a topology service request may involve more or fewer steps, or may involve the steps of the operation 400 in a different order. Furthermore, the operation 400 is explained with reference to FIG. 1. It should be appreciated that other operations to respond to a topology service request may be used in different systems and in computing systems having components other than those illustrated in the example of FIG. 1.

The example of FIG. 4 is described with reference to a generic topology service endpoint. It should be appreciated that this topology service endpoint may be any of the topology service endpoints 108 illustrated in the example of FIG. 1.

As illustrated in the example of FIG. 4, the operation 400 begins when a topology service endpoint receives a topology service request via the network 114 (402). As described above, in some instances, the topology service request includes data indicating the target service. Furthermore, as described above, the topology service request may, in some instances, include additional data.

In response to receiving the topology service request, the topology service endpoint determines whether the topology service request is a request for resource identifiers that generically identify services available at the server farm 102 (404). In different implementations, the topology service endpoint determines whether the topology service request is a request for resource identifiers that generically identify services available at the server farm 102 in different ways. For instance, the topology service request may be a SOAP document and the topology service endpoint determines that the topology service request is a request for resource identifiers that generically identify services available at the server farm 102 when the SOAP document includes an element indicating this.

If the topology service endpoint determines that the topology service request is a request for resource identifiers that generically identify services available at the server farm 102 ("YES" of 404), the topology service endpoint sends a topology service response (406). The topology service response includes resource identifiers that generically identify services available at the server farm 102. The resource identifiers include a resource identifier that generically identifies the target service. In this way, the client computing system 112 may be able to discover a resource identifier that generically identifies the target service.

On the other hand, if the topology service endpoint determines that the topology service request is not a request for resource identifiers that generically identify services available at the server farm 102 ("NO" of 404), the topology service endpoint determines whether the topology service request is a request for URIs associated with the target service (404). In various implementations, the topology service endpoint determines whether the topology service request is a request for URIs associated with the target service in different ways. In one example, the topology service endpoint determines that the topology service request is a request for URIs associated with the target service endpoint when the topology service request includes data indicating the target service.

In various implementations, the topology service request includes data that identifies the target service in various ways. For instance, in one example implementation, the topology service endpoint URI includes a parameter that identifies the target service. In some instances, the parameter that identifies the target service is a target service URI that is not specific to a particular one of the target service endpoints 106. In other words, the target service URI generically identifies the target service. For example, the topology service endpoint URI may appear as follows: "http://device1/topologyservice?target-service-uri=http://targetservice". In this example, "device1" indicates a server device that provides the topology service, "topologyservice" indicates the topology service, the "?" indicates that text following the "?" represents one or more parameters, the "target-service-uri" is a parameter name, and the "http://targetservice" is a target service URI that generically identifies the target service.

If the topology service endpoint determines that the topology service request is not a request for URIs associated with the target service ("NO" of 408), the topology service endpoint generates another type of topology service response (410). Such other types of topology service responses may contain a wide variety of different types of information depending on the service definition of the topology service.

If the topology service endpoint determines that the topology service request is a request for URIs associated with the target service ("YES" of 408), the topology service endpoint obtains resource identifiers associated with the target service (412). In some instances, the resource identifiers associated with the target service are target service endpoint URIs. As explained below, in other instances, the resource identifiers associated with the target service are load balancer resource identifiers.

In different implementations, the topology service endpoint obtains resource identifiers associated with the target service in different ways. For instance, in a first example implementation, the topology service endpoint obtains the resource identifiers associated with the target service by requesting resource identifiers associated with the target service from the data storage device 110. In a second example implementation, the topology service endpoint obtains the resource identifiers associated with the target service from messages containing the resource identifiers associated with the target service. In this second example, the messages are broadcasted to server devices in the server farm 102. In this second example implementation, the topology service endpoint does not need to send requests for the resource identifiers associated with target service. In a third example implementation, the topology service endpoint broadcasts requests for resource identifiers associated with the target service to other server devices in the server farm 102. In this third example, the other server devices in the server farm 102 respond to the request by sending resource identifiers associated with the target service to the topology service endpoint.

In a fourth example implementation, the topology service endpoint stores the resource identifiers associated with the target service in a cache after obtaining the resource identifiers associated with the target service. In this fourth example implementation, the topology service endpoint responds to the topology service request by determining whether the cache stores the resource identifiers associated with the target service and by retrieving the resource identifiers associated with the target service from the cache when the cache stores the resource identifiers associated with the target service. If the cache does not store the resource identifiers associated with the target service or if the resource identifiers associated with the target service in the cache have expired, the topology service endpoint obtains updated resource identifiers associated with the target service from the data storage device 110. In instances where the resource identifiers associated with the target service are target service endpoint URIs, the updated target resource endpoint URIs identify target service endpoints currently in the server farm 102. When the topology service endpoint receives the updated resource identifiers associated with the target service, the topology service endpoint stores the updated resource identifiers associated with the target service in the cache. The topology service endpoint responds to topology service requests by retrieving the updated resource identifiers associated with the target service from the cache and sending the updated resource identifiers associated with the target service. In this way, the topology service endpoint is able to retrieve resource identifiers associated with the target service that are at least relatively current.

After the topology service endpoint obtains the resource identifiers associated with the target service, the topology service endpoint sends a topology service response to the client computing system 112 via the network 114 (414). The topology service response specifies the resource identifiers associated with the target service. For instance, where the resource identifiers associated with the target service are target service endpoint URIs, the topology service response includes the topology service endpoint URIs. The topology service response conforms to the service definition of the topology service. In some implementations, the topology service endpoint repeats the operation 400 each time the topology service endpoint receives a topology service request.

As discussed above, in some example implementations, the topology service endpoint also sends topology service endpoint URIs to the client computing system 112. In various implementations, the topology service endpoint may send the topology service endpoint URIs to the client computing system 112 in response to the topology service request or in response to a topology service request that specifically requests the topology service endpoint URIs. In such implementations, the topology service endpoint may send the topology service endpoint URIs to the client computing system 112 in the topology service response or separately. Furthermore, in such implementations, the topology service endpoint may retrieve the topology service endpoint URIs from the data storage device 110 and/or from the cache.

Furthermore, in some implementations, the resource identifiers associated with the target service include one or more load balancer resource identifiers instead of topology service endpoint URIs. The load balancer resource identifier identifies a load balancer device in the server farm 102. A load balancer device is a computing device. The load balancer device is configured to receive target service requests and to distribute the target service requests among the target service endpoints 106. In different implementations, the topology service endpoint is configured to obtain the load balancer resource identifier is different ways. For example, the topology service endpoint obtains the load balancer resource identifier by sending a request to the data storage device 110 for resource identifiers associated with the target service. In this example, the topology service endpoint may start sending the load balancer resource identifier instead of the target service endpoint URIs when an administrator updates the data storage device 110 such that the load balancer resource identifier is associated with the target service instead of the target service endpoint URIs. Thus, in this example, the topology service endpoint does not need to be re-configured for the topology server endpoint to start obtaining the load balancer resource identifier instead of the target service endpoint URIs.

In implementations where the topology service endpoint obtains a load balancer resource identifier instead of topology service endpoint URIs, the topology service endpoint includes the load balancer resource identifier in the topology service response instead of including the topology service endpoint URIs. The client computing system 112 uses the load balancer resource identifier in the same way that the client computing system 112 would use a topology service endpoint URI. That is, the URI request module 116 stores the load balancer resource identifier and the load balancing module 120 provides the load balancer resource identifier to the client application 118 when the client application 118 requests a target service endpoint URI from the load balancing module 120. In this way, the load balancing system 100 may be transitioned from a system where load balancing occurs at the client computing system 112 to a system where load balancing occurs at the server farm 102 without modifying software on the client computing system 112.

Figure 5:
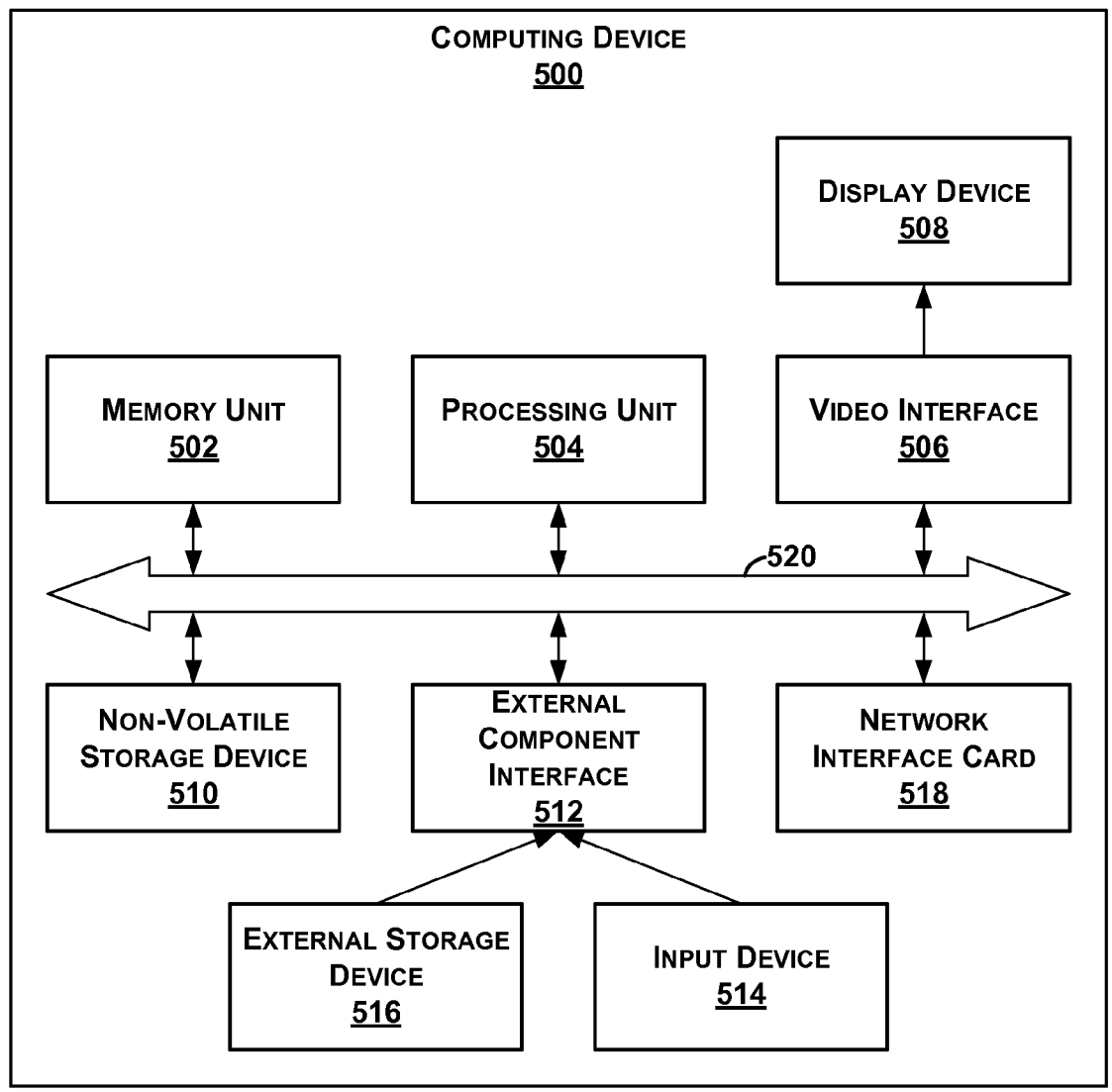
FIG. 5 is a block diagram illustrating example physical components of a physical computing device.

FIG. 5 is a block diagram illustrating example physical components of a physical computing device 500. In some instances, one or more of the server devices 104 is a physical computing device of the type illustrated in the example of FIG. 5. Furthermore, in some instances, the client computing system 112 is a physical computing device of the type illustrated in the example of FIG. 5. It should be appreciated that in different instances, the server devices 104 and/or the client computing system 112 may not include all of the physical components illustrated in the example of FIG. 5. Furthermore, it should be appreciated that in different instances, the server devices 104 and/or the client computing system 112 may include physical components in addition to those illustrated in the example of FIG. 5.

As illustrated in the example of FIG. 5, the physical computing device 500 comprises a memory unit 502. The memory unit 502 is a computer-readable data storage medium capable of storing data and/or instructions. The memory unit 502 may be a variety of different types of computer-readable storage media including, but not limited to, dynamic random access memory (DRAM), double data rate synchronous dynamic random access memory (DDR SDRAM), reduced latency DRAM, DDR2 SDRAM, DDR3 SDRAM, Rambus RAM, or other types of computer-readable storage media.

In addition, the physical computing device 500 comprises a processing unit 504. As mentioned above, a processing unit is a set of one or more physical electronic integrated circuits that are capable of executing instructions. In a first example, the processing unit 504 may execute software instructions that cause the physical computing device 500 to provide specific functionality. In this first example, the processing unit 504 may be implemented as one or more processing cores and/or as one or more separate microprocessors. For instance, in this first example, the processing unit 504 may be implemented as one or more Intel Core 2 microprocessors. The processing unit 504 may be capable of executing instructions in an instruction set, such as the x86 instruction set, the POWER instruction set, a RISC instruction set, the SPARC instruction set, the IA-64 instruction set, the MIPS instruction set, or another instruction set. In a second example, the processing unit 504 may be implemented as an ASIC that provides specific functionality. In a third example, the processing unit 504 may provide specific functionality by using an ASIC and by executing software instructions.

The physical computing device 500 also comprises a video interface 506. The video interface 506 enables the physical computing device 500 to output video information to a display device 508. The display device 508 may be a variety of different types of display devices. For instance, the display device 508 may be a cathode-ray tube display, an LCD display panel, a plasma screen display panel, a touch-sensitive display panel, a LED array, or another type of display device.

In addition, the physical computing device 500 includes a non-volatile storage device 510. The non-volatile storage device 510 is a computer-readable data storage medium that is capable of storing data and/or instructions. The non-volatile storage device 510 may be a variety of different types of non-volatile storage devices. For example, the non-volatile storage device 510 may be one or more hard disk drives, magnetic tape drives, CD-ROM drives, DVD-ROM drives, Blu-Ray disc drives, or other types of non-volatile storage devices.

The physical computing device 500 also includes an external component interface 512 that enables the physical computing device 500 to communicate with external components. As illustrated in the example of FIG. 5, the external component interface 512 enables the physical computing device 500 to communicate with an input device 514 and an external storage device 516. In one implementation of the physical computing device 500, the external component interface 512 is a Universal Serial Bus (USB) interface. In other implementations of the physical computing device 500, the physical computing device 500 may include another type of interface that enables the physical computing device 500 to communicate with input devices and/or output devices. For instance, the physical computing device 500 may include a PS/2 interface. The input device 514 may be a variety of different types of devices including, but not limited to, keyboards, mice, trackballs, stylus input devices, touch pads, touch-sensitive display screens, or other types of input devices. The external storage device 516 may be a variety of different types of computer-readable data storage media including magnetic tape, flash memory modules, magnetic disk drives, optical disc drives, and other computer-readable data storage media.

In addition, the physical computing device 500 includes a network interface card 518 that enables the physical computing device 500 to send data to and receive data from an electronic communication network. The network interface card 518 may be a variety of different types of network interface. For example, the network interface card 518 may be an Ethernet interface, a token-ring network interface, a fiber optic network interface, a wireless network interface (e.g., WiFi, WiMax, etc.), or another type of network interface.

The physical computing device 500 also includes a communications medium 520. The communications medium 520 facilitates communication among the various components of the physical computing device 500. The communications medium 520 may comprise one or more different types of communications media including, but not limited to, a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computer System Interface (SCSI) interface, or another type of communications medium.

The physical computing device 500 includes several computer-readable data storage media (i.e., the memory unit 502, the non-volatile storage device 510, and the external storage device 516). Together, these computer-readable storage media may constitute a single data storage system. As discussed above, a data storage system is a set of one or more computer-readable data storage mediums. This data storage system may store instructions executable by the processing unit 504. Activities described in the above description may result from the execution of the instructions stored on this data storage system. Thus, when this description says that a particular logical module performs a particular activity, such a statement may be interpreted to mean that instructions of the logical module, when executed by the processing unit 504, cause the physical computing device 500 to perform the activity. In other words, when this description says that a particular logical module performs a particular activity, a reader may interpret such a statement to mean that the instructions configure the physical computing device 500 such that the physical computing device 500 performs the particular activity.

The techniques of this disclosure may be realized in a variety of ways. For example, the techniques of this disclosure may be realized as a method for load balancing requests for a target service. The method comprises receiving, at a server device in a server farm, a topology service request via an electronic communications network. The server farm comprises a plurality of topology service endpoints. Each topology service endpoint in the plurality of topology service endpoints is a computing device that provides a topology service. The plurality of topology service endpoints include the server device. The server farm comprises a plurality of target service endpoints. Each target service endpoint in the plurality of target service endpoints is a computing device that provides the target service. The method also comprises in response to the topology service request, automatically sending, by the server device, a topology service response to a client computing system via the electronic communications network. The topology service response conforms to a service definition of the topology service. The topology service response comprises a plurality of target service endpoint resource identifiers. Each target service endpoint resource identifier in the plurality of target service endpoint resource identifiers identifies a different target service endpoint in the plurality of target service endpoints. The client computing system is configured to use a load-balancing algorithm to select a given target service endpoint resource identifier in the plurality of target service endpoint resource identifiers. The client computing system is further configured to send a target service request to a given target service endpoint in the plurality of target service endpoints. The given target service endpoint is identified by the given target service endpoint resource identifier.

In another example, the techniques of this disclosure may be realized as a client computing system comprising a data storage system storing a set of software instructions. The client computing system also comprises a set of microprocessors. The set of microprocessors comprises at least one microprocessor. The software instructions, when executed by the set of microprocessors, cause the client computing system to send a topology service request to a topology service endpoint in a server farm. The topology service request specifying a topology service endpoint resource identifier. The topology service endpoint resource identifier identifies the topology service endpoint. The server farm comprises a plurality of topology service endpoints. Each topology service endpoint in the plurality of topology service endpoints is a computing device that provides the topology service. The server farm comprises a plurality of target service endpoints. Each target service endpoint in the plurality of target service endpoints is a computing device that provides a target service. The software instructions, when executed by the set of microprocessors, cause the client computing system to receive a topology service response from the topology service endpoint. The topology service response is responsive to the topology service request. The topology service response conforms to a service definition of the topology service. The topology service response comprises a plurality of target service endpoint resource identifiers. Each target service endpoint resource identifier in the plurality of target service endpoint resource identifiers identifies a different target service endpoint in the plurality of target service endpoints. In addition, the software instructions, when executed by the set of microprocessors, cause the client computing system to after receiving the topology service response, select a given target service endpoint resource identifier from the plurality of target service endpoint resource identifiers using a load balancing algorithm. Furthermore, the software instructions, when executed by the set of microprocessors, cause the client computing system to after selecting the given target service endpoint resource identifier, send a target service request to a given target service endpoint in the plurality of target service endpoints. The given target service endpoint resource identifier identifies the given target service endpoint. The target service request specifies the given target service endpoint resource identifier.

In another example, the techniques of this disclosure may be realized as a load balancing system comprising a server farm. The server farm comprising a data storage device that stores a plurality of target service endpoint URIs and a plurality of topology service endpoint URIs. The server farm also comprises a plurality of server devices. Each server device in the plurality of server devices is a physical computing device. The plurality of server devices includes a plurality of target service endpoints and a plurality of topology service endpoints. Each target service endpoint URI in the plurality of target service endpoint URIs identifies a different target service endpoint in the plurality of target service endpoints. Each topology service endpoint URI in the plurality of topology service endpoint URIs identifies a different topology service endpoint in the plurality of topology service endpoints. Each target service endpoint in the plurality of target service endpoints provides a target service. Each topology service endpoint in the plurality of topology service endpoints provides a topology service. The load balancing system also comprises a client computing system comprising a data storage system and a processing unit. Furthermore, the load balancing system comprises an electronic communications network that facilitates electronic communication between the plurality of server devices in the server farm and the client computing system. The data storage system of the client computing system comprising software instructions that, when executed by the processing unit of the client computing system, cause the client computing system to automatically send a first topology service request to a first topology service endpoint in the plurality of topology service endpoints via the electronic communications network. The first topology service request specifies a first topology service endpoint URI. The first topology service endpoint URI identifies the first topology service endpoint. The first topology service endpoint URI comprises a URI that generically identifies the topology service. The first topology service endpoint is configured to retrieve, in response to the first topology service request, the plurality of topology service endpoint URIs from the data storage device when the first topology service endpoint does not store the plurality of topology service endpoint URIs in a first cache at the first topology service endpoint. The first topology service endpoint is also configured to send, in response to the first topology service request via the electronic communications network, a first topology service response. The first topology service response conforms to a service definition of the topology service. The first topology service response specifies the plurality of topology service endpoint URIs. The data storage system of the client computing system further comprises software instructions that, when executed by the processing unit, further cause the client computing system to automatically receive the first topology service response. The software instructions, when executed by the processing unit, further cause the client computing system to automatically store the plurality of topology service endpoint URIs. The client computing system only stores the first topology service endpoint URI prior to receiving the first topology service response. In addition, the software instructions, when executed by the processing unit, further cause the client computing system to automatically use a first load balancing method to select a second topology service endpoint URI from the plurality of topology service endpoint URIs. Furthermore, the software instructions, when executed by the processing unit, further cause the client computing system to automatically send a second topology service request to a second topology service endpoint in the plurality of topology service endpoints via the electronic communications network. The second topology service endpoint URI identifies the second topology service endpoint. The second topology service request specifies the second topology service endpoint URI. The second topology service endpoint URI comprises a parameter that specifies a URI that generically identifies the target service. The second topology service endpoint is further configured to receive the second topology service request via the electronic communications network. The second topology service endpoint also configured to retrieve, in response to receiving the second topology service request, the plurality of target service endpoint URIs from the data storage device when a second cache at the second topology service endpoint does not store the plurality of target service endpoint URIs. In addition, the second topology service endpoint is configured to send, in response to receiving the second topology service request, a second topology service response to the client computing system via the electronic communications network. The second topology service response specifies the plurality of target service endpoint URIs. The second topology service response conforms to the service definition of the topology service. The data storage system of the client computing system further comprising software instructions that, when executed by the processing unit of the client computing system, further cause the client computing system to receive the second topology service response via the electronic communications network. In addition, the software instructions, when executed by the processing unit, further cause the client computing system to store the plurality of target service endpoint URIs. The software instructions, when executed by the processing unit, further cause the client computing system to receive an invocation by a first client application of a first method of a first load balancing object. The first load balancing object is an instantiation of a first load balancing class. The first load balancing class extends a second load balancing class. The first method overrides a second method. The second method, when invoked, causes the client computing system to use a third load balancing algorithm to select target service endpoint URIs from the plurality of target service endpoint URIs. Furthermore, in response to receiving the invocation of the first method, the software instructions, when executed by the processing unit, cause the client computing system to use a second load balancing algorithm to select a first target service endpoint URI from the plurality of target service endpoint URIs. The first target service endpoint URI identifies a first target service endpoint in the plurality of target service endpoints. The software instructions, when executed by the processing unit, further cause the client computing system to send, after using the second load balancing algorithm to select the first target service endpoint URI, a first target service request to the first target service endpoint via the electronic communications network. The first target service request specifies the first target service endpoint URI. Furthermore, the software instructions, when executed by the processing unit, further cause the client computing system to receive a first target service response. The first target service response conforms to a service definition of the target service. In addition, the software instructions, when executed by the processing unit, further cause the client computing system to receive an invocation by a second client application of the second method of a second load balancing object. The second load balancing object is an instantiation of the second load balancing class. In response to receiving the invocation of the second method, the software instructions, when executed by the processing unit, cause the client computing system to use the third load balancing algorithm to select a second target service endpoint URI from the plurality of target service endpoint URIs. The second target service endpoint URI identifies a second target service endpoint in the plurality of target service endpoints. The third load balancing algorithm is different than the second load balancing algorithm. Furthermore, the software instructions, when executed by the processing unit, cause the client computing system to send, after using the third load balancing algorithm to select the second target service endpoint URI, a second target service request to the second target service endpoint via the electronic communications network. The second target service request specifies the second target service endpoint URI. The software instructions, when executed by the processing unit, further cause the client computing system to receive a second target service response, the second target service response conforming to the service definition of the target service.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method for service-based endpoint discovery for client-side load balancing, the method comprising:
    a server farm including a plurality of server devices, wherein each server device includes a target service endpoint and a topology service endpoint;
    a client computing system including a client application, a load balancing module, and a Uniform Resource Identifier (URI) request module;
    in response to receiving, at a topology service endpoint of a server device of the plurality of server devices, a topology service request from the URI request module, sending, by the topology service endpoint, a topology service response to the URI request module, wherein the topology service response specifies a plurality of target service endpoint resource identifiers and a plurality of topology service endpoint resource identifiers,
    each target service endpoint resource identifier identifying a different target service endpoint in the server farm,
    each topology service endpoint resource identifier identifying a different topology service endpoint in the server farm,
    storing, by the URI request module, the target service endpoint resource identifiers and the topology service endpoint resource identifiers;
    in response to receiving, by the load balancing module, a target service endpoint URI request from the client application, using a load balancing algorithm to select a target service endpoint resource identifier among the stored target service endpoint resource identifiers and returning the selected target service endpoint resource identifier to the client application;
    sending, by the client application, a target service request to the target service specified by the selected target service endpoint resource identifier;
    in response to receiving, by the load balancing module, a topology service endpoint URI request from the URI request module, using a load balancing algorithm to select a topology service endpoint resource identifier among the stored topology service endpoint resource identifiers and returning the selected topology service endpoint resource identifier to the URI request module; and
    utilizing, by the URI request module, the selected topology service endpoint resource identifier to construct a new topology service request.

2. The method of claim 1,
    wherein the topology service response comprises a plurality of topology service endpoint resource identifier, each topology service endpoint resource identifier in the plurality of topology service endpoint resource identifiers identifying a different topology service endpoint in the plurality of topology service endpoints in the server farm; and
    wherein the client computing system is further configured to use a second load balancing algorithm to select a given topology service endpoint resource identifier from the plurality of topology service endpoint resource identifiers and send a second topology service request to one of the topology service endpoints identified by the given topology service endpoint resource identifier.

3. The method of claim 1,
    wherein the topology service request comprises a topology service endpoint resource identifier that identifies an endpoint of the topology service at the server device,
    wherein the topology service endpoint resource identifier comprises a parameter; and
    wherein sending the topology service response comprises:
        automatically sending, by the server device, the topology service response when the parameter specifies a resource identifier that generically identifies the target service without identifying a computing device that provides the target service.

4. The method of claim 1,
    wherein the method further comprises:
        receiving, at the server device, updated target service endpoint resource identifiers, the updated target service endpoint resource identifiers identifying target service endpoints currently in the server farm;
        storing, by the server device, the updated target service endpoint resource identifiers in a cache; and
        in response to the topology service request, retrieving, by the server device, the updated target service endpoint resource identifiers from the cache;
    wherein sending the topology service response to the client computing system comprises sending the updated target service endpoint resource identifiers.

5. The method of claim 1, further comprising:
    receiving, by the server device, a second topology service request, the second topology service request specifying a resource identifier that generically identifies the topology service; and
    in response to the second topology service request, sending, by the server device, a second topology service response,
        the second topology service response conforming to the service definition of the topology service,
        the second topology service response comprising a load balancer resource identifier,
        the load balancer resource identifier identifying a load balancer device configured to distribute target service requests received by the load balancer device among the target service endpoints,
        the client computing system configured to provide the load balancer resource identifier to a client application at the client computing system, the client application using the load balancer resource identifier to send a second target service request to the load balancer device.

6. The method of claim 1, wherein the target service endpoint resource identifiers identify server devices in the server farm and the target service.

7. The method of claim 1,
    wherein the target service request specifies a search query; and
    wherein the method further comprises: sending, by the server device, a target service response to the client computing system via the electronic communications network, the target service response specifying a list of web pages in a website that satisfy the search query.

8. The method of claim 1, wherein the server device comprises a memory unit and a processing unit, the memory unit storing software instructions that, when executed by the processing unit, enable the server device to receive the topology service request and cause the server device to send the topology service response.

9. A client computing system for service-based endpoint discovery for client-side load balancing, the client computing system comprising:
   a client application, a load balancing module, and a Uniform Resource Identifier (URI) request module;
   a data storage system storing a set of software instructions; and
   a set of microprocessors, the set of microprocessors comprising at least one microprocessor, the software instructions, when executed by the set of microprocessors, cause the client computing system to:
      send a topology service request from the URI request module to a topology service endpoint of a server device in a server farm,
         the server farm including a plurality of server devices, wherein each server device includes a target service endpoint and a topology service endpoint;
      receive, by the URI request module, a topology service response from the topology service endpoint,
         the topology service response being responsive to the topology service request,
         the topology service response specifying a plurality of target service endpoint resource identifiers and a plurality of topology service endpoint resource identifiers,
            each target service endpoint resource identifier identifying a different target service endpoint in the server farm;
            each topology service endpoint resource identifier identifying a different topology service endpoint in the server farm,
      store, by the URI request module, the target service endpoint resource identifiers and the topology service endpoint resource identifiers;
      in response to receiving, by the load balancing module, a target service endpoint URI request from the client application, use a load balancing algorithm to select a target service endpoint resource identifier among the stored target service endpoint resource identifiers and returning the selected target service endpoint resource identifier to the client application;
      send, by the client application, a target service request to the target service specified by the selected target service endpoint resource identifier;
      in response to receiving, by the load balancing module, a topology service endpoint URI request from the URI request module, use a load balancing algorithm to select a topology service endpoint resource identifier among the stored topology service endpoint resource identifiers and returning the selected topology service endpoint resource identifier to the URI request module; and
      utilize, by the URI request module, the selected topology service endpoint resource identifier to construct a new topology service request.

10. The client computing system of claim 9,
   wherein the given target service endpoint resource identifier is a first target service endpoint resource identifier and the load balancing algorithm is a first load balancing algorithm;
   wherein the software instructions that cause the client computing system to select the first target service endpoint resource identifier comprise software instructions that, when executed by the set of microprocessors, cause the client computing system to: use the first load balancing algorithm to select the first target service endpoint resource identifier for a first client application; and
   wherein the software instructions, when executed by the set of microprocessors, cause the client computing system to: use a second load balancing algorithm to select a second target service endpoint resource identifier from the plurality of target service endpoint resource identifiers for a second client application.

11. The client computing system of claim 9,
   wherein the software instructions, when executed by the set of microprocessors, further cause the client computing system to:
      automatically send new topology service requests to the topology service endpoint; and
      automatically receive new topology service responses from the topology service endpoint, the new topology service responses indicating updated target service endpoint resource identifiers that identify target service endpoints currently in the server farm.

12. The client computing system of claim 9,
   wherein the topology service endpoint is a first topology service endpoint; and
   wherein the software instructions, when executed by the set of microprocessors, further cause the client computing system to:
      automatically receive a plurality of topology service endpoint resource identifiers, each topology service endpoint resource identifier in the plurality of topology service endpoint resource identifiers identifying different topology service endpoints in the plurality of topology service endpoints;
      automatically select a given topology service endpoint resource identifier from the plurality of topology service endpoint resource identifiers using a second load balancing algorithm; and
      automatically send a second topology service request to a given topology service endpoint identified by the given topology service endpoint resource identifier, the plurality of topology service endpoints including the given topology service endpoint.

13. The client computing system of claim 12, wherein prior to receiving the plurality of topology service endpoint resource identifiers, the client computing system only stores a topology service endpoint resource identifier that identifies the first topology service endpoint.

14. The client computing system of claim 12,
   wherein the topology service request is a first topology service request and the topology service response is a first topology service response;
   wherein the software instructions, when executed by the set of microprocessors, further cause the client computing system to: automatically send a third topology service request to the first topology service endpoint, the third topology service request specifying a resource identifier that generically identifies the topology service; and
   wherein the software instructions that, when executed by the set of microprocessors, cause the client computing system to automatically receive the plurality of topology service endpoint resource identifiers comprise software instructions that, when executed by the set of microprocessors, cause the client computing system to receive a second topology service response, the second topology service response conforming to the service definition of the topology service, the second topology service response specifying the plurality of topology service endpoint resource identifiers.

15. The client computing system of claim 9,
wherein the software instructions that, when executed by the set of microprocessors, cause the client computing system to send the target service request comprise software instructions that, when executed by the set of microprocessors, cause the client computing system to send the target service request such that the target service request specifies a request to process data in a spreadsheet stored at the server farm.

16. The client computing system of claim 9, wherein the software instructions, when executed by the set of microprocessors, further cause the client computing system to:
blacklist the given target service endpoint resource identifier when the given target service endpoint does not respond to the target service request; and
use the load balancing algorithm to select a second target service endpoint resource identifier from ones of the plurality of target service endpoint resource identifiers that are not blacklisted.

17. The client computing system of claim 9,
wherein the software instructions, when executed by the set of microprocessors, further cause the client computing system to: receive an invocation by a client application of a method of a load balancing object, the load balancing object being an instantiation of a load balancing class; and
wherein the software instructions that, when executed by the set of microprocessors, cause the client computing system to select the given target service endpoint resource identifier comprise software instructions that, when executed by the set of microprocessors, cause the client computing system to select the given target service endpoint resource identifier in response to the invocation of the method.

18. The client computing system of claim 17,
wherein the load balancing class is a first load balancing class, the method is a first method, and the load balancing algorithm is a first load balancing algorithm;
wherein the first load balancing class extends a second load balancing class and the first method overrides a second method in the second load balancing class; and
wherein the second method, when invoked, causes the client computing system to use a second load balancing algorithm to select target service endpoint resource identifiers from the plurality of target service endpoint resource identifiers, the second load balancing algorithm being different than the first load balancing algorithm.

19. The client computing system of claim 9, wherein the topology service request specifies a topology service endpoint resource identifier that identifies the topology service endpoint, the topology service endpoint resource identifier comprising a resource identifier that generically identifies the target service.

20. A load balancing system comprising:
a server farm comprising:
a data storage device that stores a plurality of target service endpoint Uniform Resource Identifiers (URIs) and a plurality of topology service endpoint URIs; and
a plurality of server devices,
each server device in the plurality of server devices being a physical computing device,
the plurality of server devices including a plurality of target service endpoints and a plurality of topology service endpoints,
each target service endpoint URI in the plurality of target service endpoint URIs identifying a different target service endpoint in the plurality of target service endpoints,
each topology service endpoint URI in the plurality of topology service endpoint URIs identifying a different topology service endpoint in the plurality of topology service endpoints,
each target service endpoint in the plurality of target service endpoints providing a target service,
each topology service endpoint in the plurality of topology service endpoints providing a topology service;
a client computing system comprising a data storage system and a processing unit; and
an electronic communications network that facilitates electronic communication between the plurality of server devices in the server farm and the client computing system;
the data storage system of the client computing system comprising software instructions that, when executed by the processing unit of the client computing system, cause the client computing system to: automatically send a first topology service request to a first topology service endpoint in the plurality of topology service endpoints via the electronic communications network, the first topology service request specifying a first topology service endpoint URI, the first topology service endpoint URI identifying the first topology service endpoint, the first topology service endpoint URI comprising a URI that generically identifies the topology service;
the first topology service endpoint configured to retrieve, in response to the first topology service request, the plurality of topology service endpoint URIs from the data storage device when the first topology service endpoint does not store the plurality of topology service endpoint URIs in a first cache at the first topology service endpoint;
the first topology service endpoint configured to send, in response to the first topology service request via the electronic communications network, a first topology service response, the first topology service response conforming to a service definition of the topology service, the first topology service response specifying the plurality of topology service endpoint URIs;
the data storage system of the client computing system further comprising software instructions that, when executed by the processing unit, further cause the client computing system to:
automatically receive the first topology service response;
automatically store the plurality of topology service endpoint URIs, the client computing system only storing the first topology service endpoint URI prior to receiving the first topology service response;
automatically use a first load balancing method to select a second topology service endpoint URI from the plurality of topology service endpoint URIs;
automatically send a second topology service request to a second topology service endpoint in the plurality of topology service endpoints via the electronic communications network, the second topology service endpoint URI identifying the second topology service endpoint, the second topology service request specifying the second topology service endpoint URI, the second topology service endpoint URI comprising a parameter that specifies a URI that generically identifies the target service;

the second topology service endpoint configured to receive the second topology service request via the electronic communications network;

the second topology service endpoint configured to retrieve, in response to receiving the second topology service request, the plurality of target service endpoint URIs from the data storage device when a second cache at the second topology service endpoint does not store the plurality of target service endpoint URIs;

the second topology service endpoint configured to send, in response to receiving the second topology service request, a second topology service response to the client computing system via the electronic communications network, the second topology service response specifying the plurality of target service endpoint URIs, the second topology service response conforming to the service definition of the topology service;

the data storage system of the client computing system further comprising software instructions that, when executed by the processing unit of the client computing system, further cause the client computing system to:

receive the second topology service response via the electronic communications network;

store the plurality of target service endpoint URIs;

receive an invocation by a first client application of a first method of a first load balancing object, the first load balancing object being an instantiation of a first load balancing class, the first load balancing class extending a second load balancing class, the first method overriding a second method, the second method, when invoked, causing the client computing system to use a second load balancing algorithm to select target service endpoint URIs from the plurality of target service endpoint URIs;

in response to receiving the invocation of the first method, use the second load balancing algorithm to select a first target service endpoint URI from the plurality of target service endpoint URIs, the first target service endpoint URI identifying a first target service endpoint in the plurality of target service endpoints;

send, after using the second load balancing algorithm to select the first target service endpoint URI, a first target service request to the first target service endpoint via the electronic communications network, the first target service request specifying the first target service endpoint URI;

receive a first target service response, the first target service response conforming to a service definition of the target service, receive an invocation by a second client application of the second method of a second load balancing object, the second load balancing object being an instantiation of the second load balancing class;

in response to receiving the invocation of the second method, use the third load balancing algorithm to select a second target service endpoint URI from the plurality of target service endpoint URIs, the second target service endpoint URI identifying a second target service endpoint in the plurality of target service endpoints, the third load balancing algorithm being different than the second load balancing algorithm;

send, after using the third load balancing algorithm to select the second target service endpoint URI, a second target service request to the second target service endpoint via the electronic communications network, the second target service request specifying the second target service endpoint URI;

receive a second target service response, the second target service response conforming to the service definition of the target service.

* * * * *